(12) United States Patent
Rabinovich et al.

(10) Patent No.: US 12,038,782 B2
(45) Date of Patent: Jul. 16, 2024

(54) SYSTEM AND METHOD OF SYNCHRONIZING A DISTRIBUTED CLOCK IN A PACKET-COMPATIBLE NETWORK

(71) Applicant: ADTRAN Networks SE, Meiningen (DE)

(72) Inventors: Michael Rabinovich, Modiin (IL); Moshe Tofef, Netanya (IL)

(73) Assignee: ADTRAN Networks SE, Meiningen (DE)

( * ) Notice: Subject to any disclaimer, the term of this patent is extended or adjusted under 35 U.S.C. 154(b) by 178 days.

(21) Appl. No.: 17/107,090

(22) Filed: Nov. 30, 2020

(65) Prior Publication Data

US 2021/0294378 A1 Sep. 23, 2021

(51) Int. Cl.
*G06F 1/12* (2006.01)
*G06F 21/60* (2013.01)
*G06F 21/62* (2013.01)
*H04J 3/06* (2006.01)
*H04L 9/08* (2006.01)

(52) U.S. Cl.
CPC ............. *G06F 1/12* (2013.01); *G06F 21/602* (2013.01); *G06F 21/6218* (2013.01); *H04J 3/0644* (2013.01); *H04J 3/0667* (2013.01); *H04J 3/0673* (2013.01); *H04L 9/085* (2013.01)

(58) Field of Classification Search
CPC ...... G06F 1/12; G06F 21/602; G06F 21/6218; H04J 3/0644; H04J 3/0667; H04J 3/0673; H04L 9/085
See application file for complete search history.

(56) References Cited

U.S. PATENT DOCUMENTS 8,416,763 B1 * 4/2013 Montini .............. H04L 43/0858
370/350
9,998,247 B1 * 6/2018 Choudhury ........... H04J 3/0667
2010/0287402 A1 11/2010 Kim et al.
2013/0326220 A1 12/2013 Connelly et al.
(Continued)

OTHER PUBLICATIONS

European Search Report corresponding to Application No. 20 16 4487; dated Sep. 23, 2020.

*Primary Examiner* — Benjamin E Lanier
*Assistant Examiner* — Zoha Piyadehghibi Tafaghodi
(74) *Attorney, Agent, or Firm* — Whitestone Law, PLLC

(57) ABSTRACT

There is provided a technique of clock managing in a packet data network implementing a time-transfer protocol. The technique comprises: modifying, by the timing-server, a timestamp record to enable a controllable access to data informative of the least significant part of clock-informative data (CLSP data), wherein modifying the timestamp record comprises modifying the least significant part of the timestamp record (RLSP) to comprise the CLSP data in an encrypted form or to comprise values substituting, in a predefined manner, the CLSP data; transferring the modified timestamp record to all timing-clients, wherein CLSP data are transferred in a controllable access manner; enabling access to the CLSP data merely to authorized timing-clients among the plurality of timing-clients; and enabling the authorized timing-clients to obtain the CLSP data and synchronize the respective clocks using the CLSP data together with data informative of the most significant part of the clock-informative data.

17 Claims, 7 Drawing Sheets

(56) References Cited

U.S. PATENT DOCUMENTS

| | | | |
|---|---|---|---|
| 2015/0063362 A1* | 3/2015 | Poledna | H04L 45/44 370/400 |
| 2015/0117471 A1* | 4/2015 | Mizrahi | H04L 63/0485 370/512 |
| 2015/0139251 A1* | 5/2015 | Tzeng | H04L 43/106 370/503 |
| 2016/0277138 A1* | 9/2016 | Garg | H04L 41/0816 |
| 2019/0253167 A1* | 8/2019 | Wihamre | H04L 69/28 |
| 2019/0274109 A1 | 9/2019 | Knowles | |

* cited by examiner

SYSTEM AND METHOD OF SYNCHRONIZING A DISTRIBUTED CLOCK IN A PACKET-COMPATIBLE NETWORK

CROSS-REFERENCE TO RELATED APPLICATION

This application claims priority to European Patent Application No. 20164487.9, filed on Mar. 20, 2020, the entirety of which is herein incorporated by reference.

TECHNICAL FIELD

The presently disclosed subject matter relates to the field of data communication, and, more particularly, to distributing a clock in a packet data network (PDN).

BACKGROUND

Proper operation of a data network (e.g. a telecommunication network) requires time and/or frequency synchronization between various entities therein. Synchronization can be achieved, for example, by exchange timing information across the network. One of the protocols for exchanging timing information (time-transfer) over a packet data network is the IEEE 1588 Precision Time Protocol (PTP) usable for frequency and phase synchronization. Another example of time-transfer protocol is Network Time Protocol (NTP). Both protocols are in-band protocols encapsulating records related to clock-informative data (referred to hereinafter as timestamp records or timestamps) into data packets. While in the NTP case the network nodes receive synchronization data in a pull mode (from a server or from several peer nodes), in the PTP cases, slave clock nodes (referred to hereinafter also as slave clocks), receive synchronization data from a master clock node (referred to hereinafter also as a master clock) in a push mode. NTP clients or PTP slave clocks nodes are referred to hereinafter also as timing-clients, and NTP server or PTP master clock node are referred to hereinafter also as timing-server.

For purpose of illustration only, and unless specifically stated otherwise, the following description is provided for PTP-based synchronization. Those skilled in the art will readily appreciate that the teachings of the presently disclosed subject matter are, likewise, applicable to other time-transfer protocols and/or procedures that are usable for the exchange of time-related information in a packet data network.

Through exchange of PTP packets, which include timestamps carried inside, PTP enables synchronization between a master clock node, which has access to an accurate time source (e.g. Global Positioning System) and slave clock nodes having less accurate clocks. Timestamps are usable for frequency and phase recovery between the clocks.

General Description

In accordance with certain aspects of the presently disclosed subject matter, there is a need in varying accuracy of the clock delivered from the timing-server to different timing-clients. By way of non-limiting example, in a public network some customers need high accuracy time delivery and are willing to pay for it, while other customers may be satisfied with low accuracy free service. Accordingly, there is provided a technique of controlling the timestamp accuracy delivered to specific timing-clients and/or groups thereof.

In accordance with certain aspects of the presently disclosed subject matter, there is provided a method of clock managing in a packet data network (PDN) implementing a time-transfer protocol, the network comprising a plurality of timing-clients operatively connected to a timing-server. The method comprises: modifying, by the timing-server, a timestamp record to enable a controllable access to data informative of the least significant part of clock-informative data (CLSP data), wherein modifying the timestamp record comprises one of: a) modifying the least significant part of the timestamp record (RLSP) to comprise the CLSP data in an encrypted form and b) modifying the RLSP to comprise values substituting, in a predefined manner, the CLSP data; transferring the modified timestamp record to all timing-clients among the plurality of timing clients, wherein CLSP data are transferred in a controllable access manner; enabling access to the CLSP data merely to authorized timing-clients among the plurality of timing-clients; and enabling the authorized timing-clients to obtain the CLSP data and synchronize the respective clocks using the obtained CLSP data together with data informative of the most significant part of the clock-informative data (CMSP data), whilst enabling availability of the CMSP data for all timing-clients.

Optionally, CLSP data can be encrypted and further transferred as an encrypted TLV (type-length-value) data structure attached to a time-transfer protocol's message transferring the modified timestamp. Such a message can comprise a special indication of a presence of the attached encrypted TLV data structure, the TLV data structure to be decrypted with the help of keys shared between the timing-server and the authorized timing-clients.

Alternatively, CLSP data can be transferred separately from a time-transfer protocol's message that transfers the modified timestamp, and merely to the authorized clients. The message transferring the modified timestamp can comprise special indications of modification of the least significant part, thereby enabling the authorized timing-clients to obtain the separately transferred CLSP data corresponding to the modified timestamp. Optionally, the timing-server can transfer CLSP to authorized clients in accordance with a preconfigured list available to the timing-server, and comprising data indicative, for each authorized timing-client, of a unique clock identifier of the timing-client and IP address of a respective hosting network node. By way of another non-limiting example, the timing-server can transfer CLSP to authorized clients in accordance with a preconfigured list available to the timing-server and comprising data indicative of a unique clock identifier of each authorized timing-client, wherein IP addresses of respective hosting network nodes are derived from unicast message negotiation specified by the time-transfer protocol. By way of yet another non-limiting example, the timing-server can transfer CLSP to respective authorized clients as PTP signaling management messages with proprietary TLV carrying CLSP or as proprietary PTP messages.

In accordance with other aspects of the presently disclosed subject matter, there is provided a timing-server configured to operate in a packet data network (PDN) implementing a time-transfer protocol, the network comprising a plurality of timing-clients operatively connected to a timing-server, the timing-server configured to operate in accordance with the method above.

In accordance with other aspects of the presently disclosed subject matter, there is provided a timing-client configured to operate in a packet data network (PDN) implementing a time-transfer protocol, the network comprising a plurality of timing-clients operatively connected to a timing-server, the timing-client configured to operate in accordance with the method above.

In accordance with other aspects of the presently disclosed subject matter, there is provided a computer program product implemented on a non-transitory computer usable medium and comprising computer readable program code for performing the method above.

Among advantages of certain embodiments of presently disclosed subject matter is enabling a clock distribution with accuracy adaptable for timing-clients' requirements.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "transferring", "modifying", "generating", "using" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the controller, the clock agent and respective parts thereof disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1A:
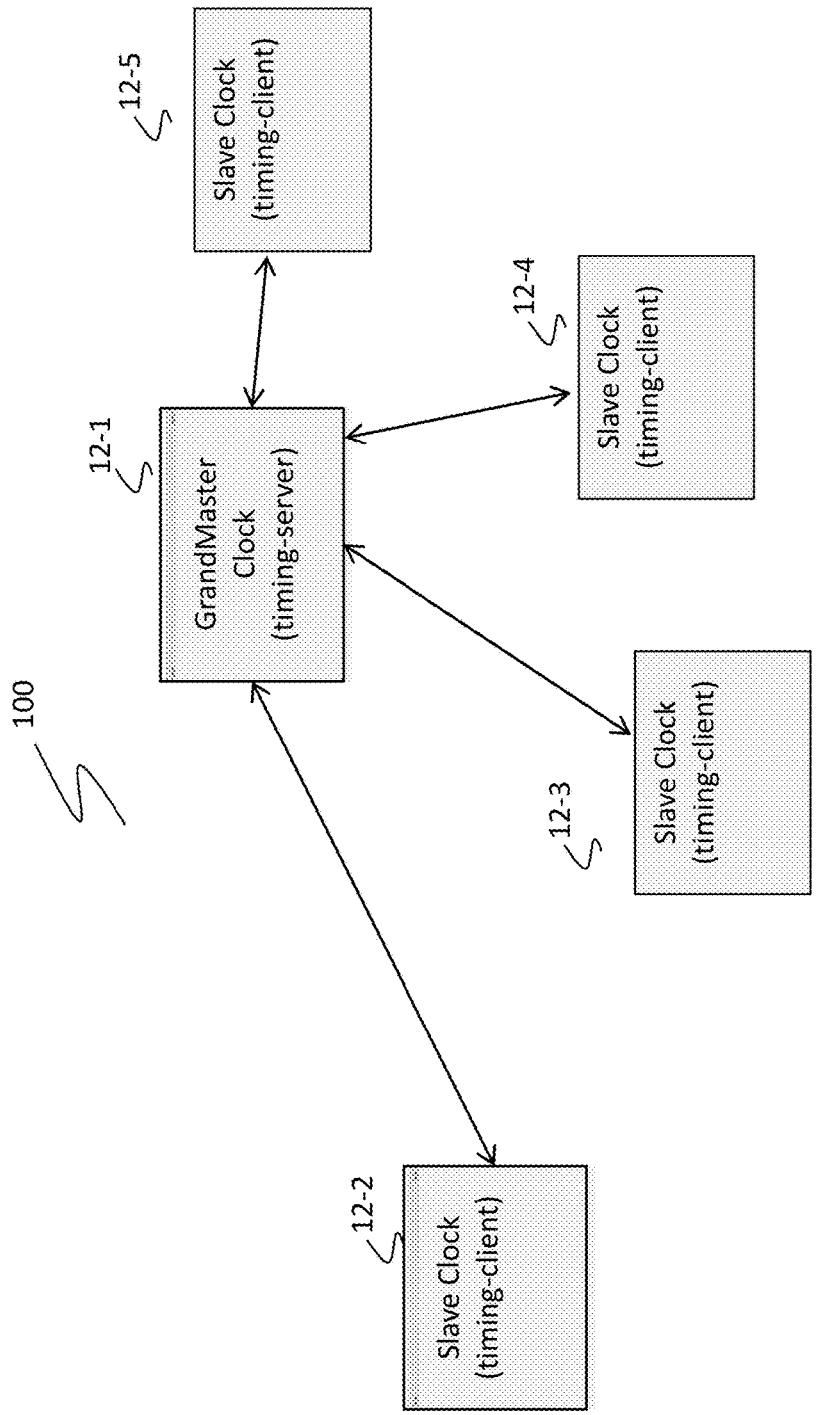
FIG. 1a illustrates a generalized schematic architecture of an exemplary time distribution network implementing the Precision Time Protocol (PTP) as known in prior art.

Bearing this in mind, attention is drawn to FIG. 1a schematically illustrating an exemplary time distribution network 100 including a plurality of clock nodes denoted as 12-1-12-5 and implementing the Precision Time Protocol (PTP) as known in prior art. Each clock node comprises a processing and memory circuitry with a clock circuitry. In accordance with IEEE 1588 standards, distribution of timing information in the network 100 is implemented in a hierarchical manner.

Clock nodes 12-2-12-5 are operatively connected to the clock node 12-1 via respective clock ports (not shown). Clock node 12-1 is configured to be the source of synchronization data, i.e. to serve as PTP master clock node (timing-server) and to provide the timing reference to the slave clock nodes 12-2-12-5 (timing-clients). PTP master clock nodes receives and/or generates accurate clock-informative data, generates respective timestamps and distributes them over the network 100.

The exemplary PTP-based time distribution network 100 operates on top of a packet-compatible communication network (not shown) which may have ring, bus, tree, star, or mesh topologies, or a combination of different topologies. Clock nodes correspond to the hosting network nodes of the underlying communication network and can constitute parts of the respective network nodes.

Figure 1B:
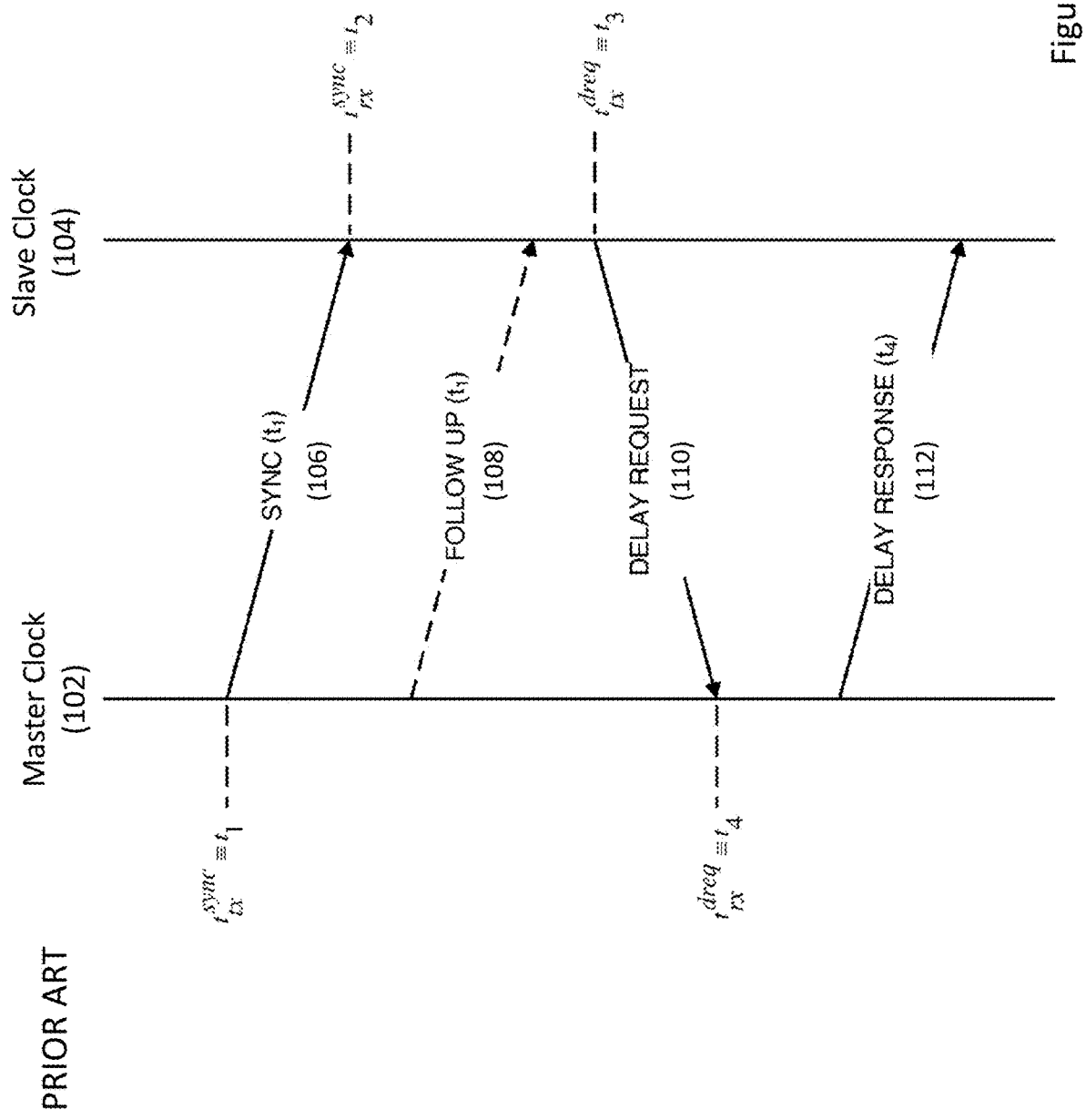
FIG. 1b illustrates a clock synchronization procedure in accordance with the PTP protocol as known in prior art.

Referring to FIG. 1b, there is illustrated a simplified sequence of message exchange between the master clock node 12-1 and one of slave nodes when operating the PTP protocol as known in prior art. FIG. 1b provides a pictorial representation of SYNC, SYNC FOLLOW UP, DELAY RESPONSE, and DELAY REQUEST messages and the associated timing information that are exchanged between a master clock 102 and a slave clock 104. SYNC message 106 comprises embedded by the master clock timestamp, $t_{tx}^{sync}$ (referred to hereinafter also as $t_1$), which represents the time at which the transmission of the SYNC message 106 was initiated. The SYNC message 106 is received at a certain time, $t_{rx}^{sync}$ (referred to hereinafter also as $t_2$), by the receiving slave clock 104. Since $t_2$ is measured by the slave clock, the value of $t_2$ can be less accurate than $t_1$ measured by the master clock. Equation (1) expresses the relationship between the time values $t_1$ and $t_2$ in terms of the network transit delay ($\Delta t_{delay}^{sync}$) and the time offset ($\Delta t_{offset}$) between the slave clock measurement and the master clock measurement: $t_2 = t_1 + \Delta t_{delay}^{sync} + \Delta t_{offset} = t_1 + \Delta t^{sync}(1)$.

Optionally (e.g. when the master clock hardware does not support inclusion of timestamp $t_1$ in the SYNC message 106), a highly accurate hardware measurement of the timestamp, $t_1$, can be transferred not within the sync packet itself, but within a separate SYNC FOLLOW UP message 108.

The slave clock sends to the master clock DELAY REQUEST message 110 informative of measured by the slave clock transmission time $t_{tx}^{dreq}$ (referred to hereinafter also as $t_3$). The master clock notes the reception time, $t_{rx}^{dreq}$ (referred to hereinafter also as $t_4$) of the DELAY REQUEST message 110; it generates, in response, DELAY RESPONSE message 112 and transmits the DELAY RESPONSE message 112 to the slave clock. The DELAY RESPONSE message 112 provides the timing information $t_4$ back to the slave clock. Similar to Equation (1), the relationship between time values $t_3$ and $t_4$ can be expressed as: $t_4=t_3+\Delta t_{delay}^{dreq}+\Delta t_{offset}=t_3+\Delta t^{dreq}$ (2). Equations (1) and (2) can produce the slave clock offset $\Delta t_{offset}$ indicative of time difference between the slave clock and the master clock.

The values of $t_1$, $t_4$ (collectively referred to also as master timestamps) transmitted to the slave clock 104 as part of message exchange and values $t_2$ and $t_3$ (collectively referred to also as slave timestamps) generated by the slave clock 104 are stored in a memory location accessible by the slave clock 104. The slave clock further uses the collected timestamps and generates clock-recovery data usable for clock (i.e. frequency and/or phase) recovery.

In addition to exchange of synchronizing messages detailed above with reference to FIG. 1B, PTP supports other synchronizing messages (e.g. for peer-to-peer synchronization). PTP also supports other announce and signaling messages usable to configure and maintain the PTP-based clock distribution.

In both NTP and PTP protocols, time delivery accuracy is determined by time stamp accuracy and network conditions.

It is noted that a clock synchronization algorithm at a slave clock collects and filters the received timestamps during a collection period, and further uses the collected information for steering local time and frequency to match its recovered time to the server's time. The collection period depends, for example, on the network conditions, local oscillator parameters, required accuracy, etc.

Figure 2:
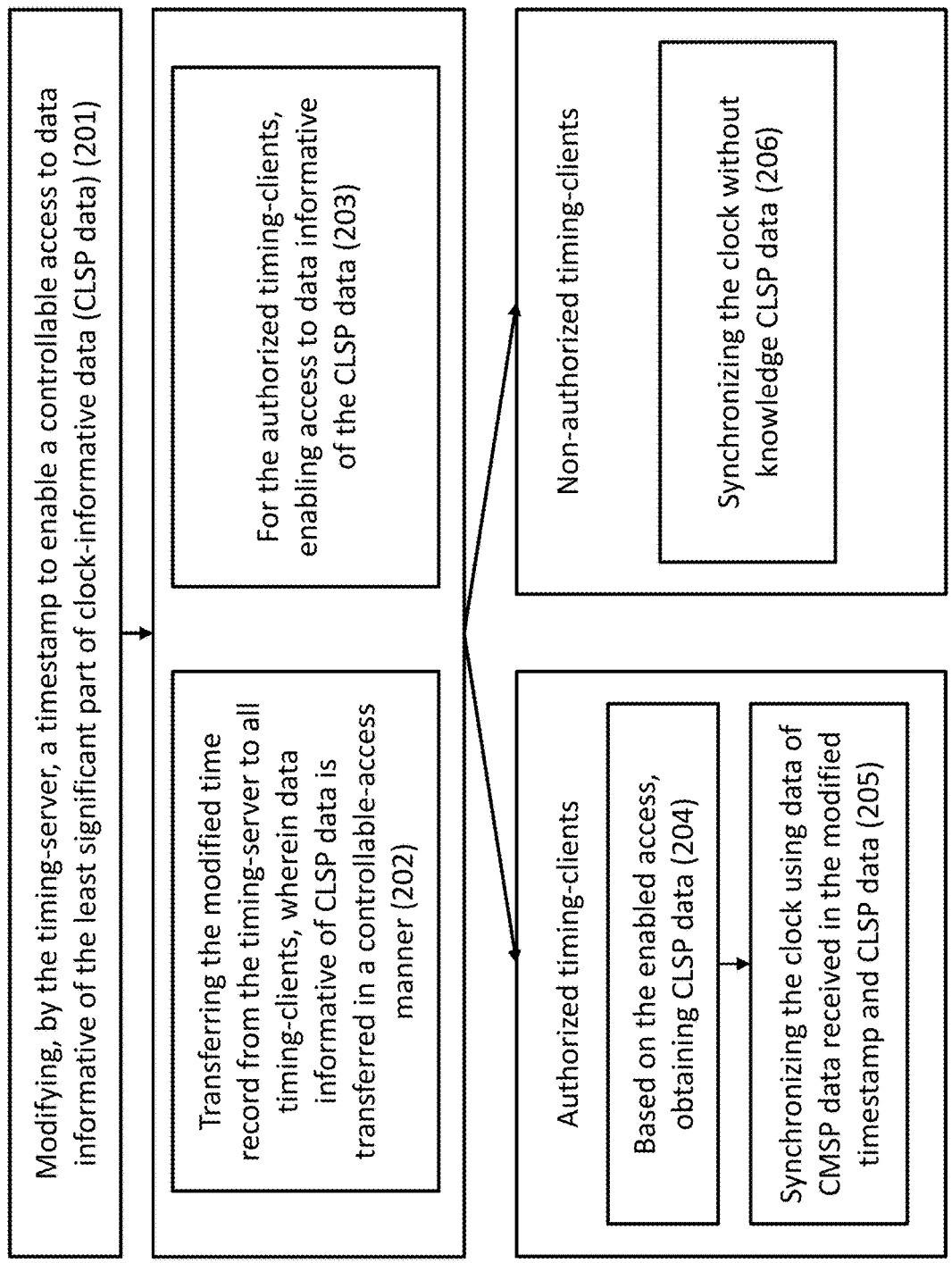
FIG. 2 illustrates a generalized flow chart of timestamp delivery in accordance with certain embodiments of the presently disclosed subject matter.

Referring to FIG. 2, there is illustrated a generalized flow chart of timestamp delivery from a timing-server to timing-clients. In accordance with certain embodiments of the presently disclosed subject matter, the timing-server is configured to modify (201) a timestamp record so to enable controllable access to data informative of the least significant part of clock-informative data (referred to hereinafter as CLSP data).

Unless specifically stated otherwise, it is appreciated that throughout the specification the terms related to controlling access to certain data refer to technique(s) regulating which timing-client can use the respective data. As will be further detailed by way of non-limiting examples with reference to FIGS. 5-6, the access can be controlled by encrypting the least significant part of clock informative data and/or by delivering the least significant part of clock informative data merely to authorized timing-clients.

Figure 3:
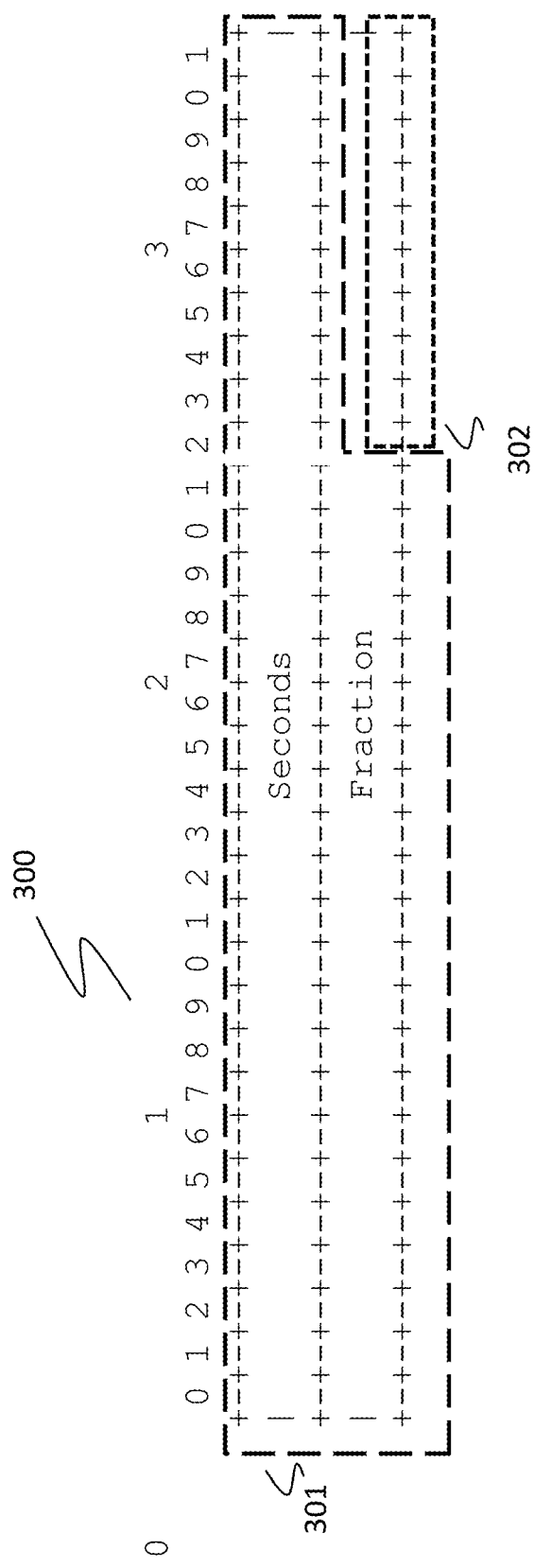
FIG. 3 schematically illustrates a timestamp configured in accordance with certain embodiments of the presently disclosed subject matter.

Timestamp records in both PTP and NTP protocols have the similar format. Timestamp field comprises 32 bits subfield for the second and 32 bits subfield for the fractions of seconds. An exemplarily timestamp record 300 is schematically illustrated in FIG. 3. In the illustrated example, bits corresponding to seconds, milliseconds and microseconds constitute the most significant part and are recorded in the most significant part (RMSP) 301 of the timestamp record, while bits corresponding to nanoseconds constitute the least significant part and are recorded in the least significant part (RLSP) 302 of the timestamp.

For purpose of illustration only and unless specifically stated otherwise, the following description is provided for timestamp records configured in a manner illustrated in FIG. 3. Those skilled in the art will readily appreciate that the teachings of the presently disclosed subject matter are, likewise, applicable to other timestamp configurations. By way of non-limiting example, the timestamp record can comprise the most significant part (e.g. corresponding to seconds and milliseconds) and a plurality of less significant parts each configured to enable separately controllable access (e.g. separately controllable parts corresponding to microseconds and to nanoseconds).

Referring back to FIG. 2, the timing-server transfers (202) to the timing-clients timestamps each comprising RMSP and RLSP. Data informative of CLSP (the least significant part of clock-informative data) are transferred in a manner enabling accessibility merely to authorized timing-clients. For such authorized timing-clients, the timing-server (and/or an external system operating in conjunction with the timing-server) enables (203) access to data informative of CLSP. As further detailed with reference to FIGS. 5-6, data informative of CLSP can be transferred in encrypted or in clear text mode, it can be transferred in pull or push mode in accordance with a list of authorized timing clients, and it can be transferred together or separately of data informative of CMSP (the most significant part of the clock-informative data).

An authorized timing-client obtains (204), for a given timestamp and based on the enabled access, data informative of the least significant part of the clock-informative data and synchronizes (205) its clock using together data informative of the most significant and data of the least significant parts of the clock-informative data. Non-authorized timing-client synchronizes (206) its clock without knowledge of CLSP data and, thus, with accuracy lower than the accuracy available for the authorized timing-client.

Figure 4:
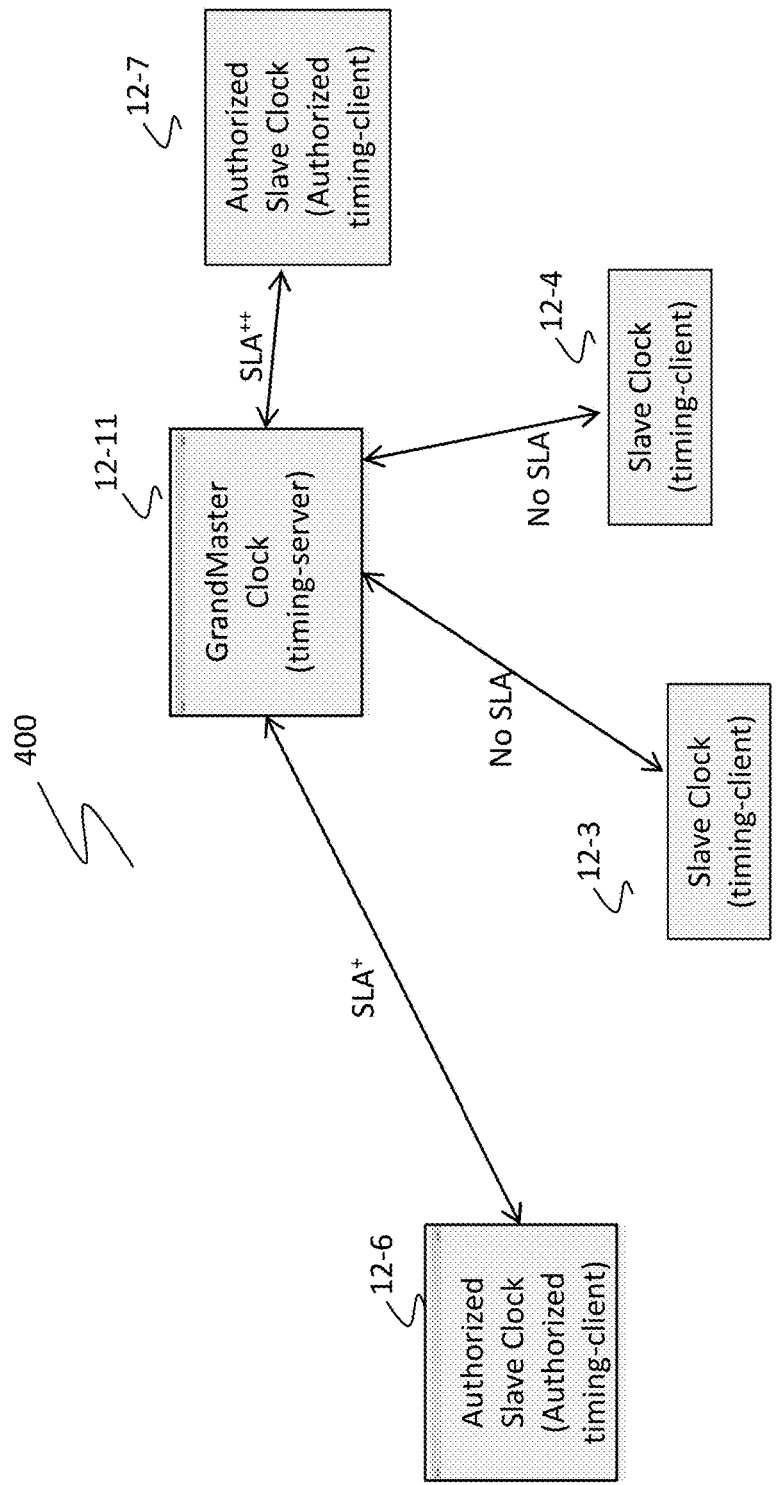
FIG. 4 illustrates a generalized schematic architecture of an exemplary time distribution network implementing the Precision Time Protocol (PTP) in accordance with certain embodiments of the presently disclosed subject matter.

For purpose of illustration only and unless specifically stated otherwise, the following description is provided for clock synchronization based on a single timestamp. Those skilled in the art will readily appreciate that the teachings of the presently disclosed subject matter are, likewise, applicable to timing-clients configured to synchronize the clock based on a plurality of the timestamps received during a collection period. Referring to FIG. 4, there is illustrated a generalized schematic architecture of an exemplary time distribution network implementing the Precision Time Protocol (PTP) in accordance with certain embodiments of the presently disclosed subject matter.

Timing-server 12-11 is configured to operate as detailed with reference to FIG. 2. Timing-clients 12-3 and 12-4 are non-authorized timing-clients having no SLA requirements of the received time accuracy. Timing-client 12-7 is an authorized client with SLA requirements of time accuracy and timing-client 12-6 is an authorized client with enhanced SLA requirements of time accuracy.

In the illustrated example of FIG. 4, the timestamp record can comprise the most significant part (e.g. corresponding to seconds and milliseconds), a less significant part (e.g. a part corresponding to microseconds) and the least significant part (e.g. corresponding to nanoseconds) with separately controllable access.

In accordance with the method detailed above with reference to FIG. 2, time synchronization by non-authorized timing-clients 12-3 and 12-4 is based on the knowledge of, merely, data of the most significant part of the clock-informative data (i.e. seconds and milliseconds). In correspondence with SLA, authorized timing-client 12-7 has further knowledge of data of the less significant part of clock-informative data corresponding to microseconds, and can provide time synchronization with improved accuracy; while authorized timing-client 12-6 has knowledge of data of the entire clock-informative data and can provide time synchronization with the highest (among the illustrated clients) accuracy.

It is noted that implementing the method above requires no changes for non-authorized timing-clients providing time synchronization based, merely, on the knowledge of data of the most significant part of the clock-informative data. As will be further detailed with reference to FIGS. 5-6, in accordance with certain embodiments of the presently disclosed subject matter, the authorized timing-clients shall be configured to enable the access to more accurate data having controllable access.

Figure 5:
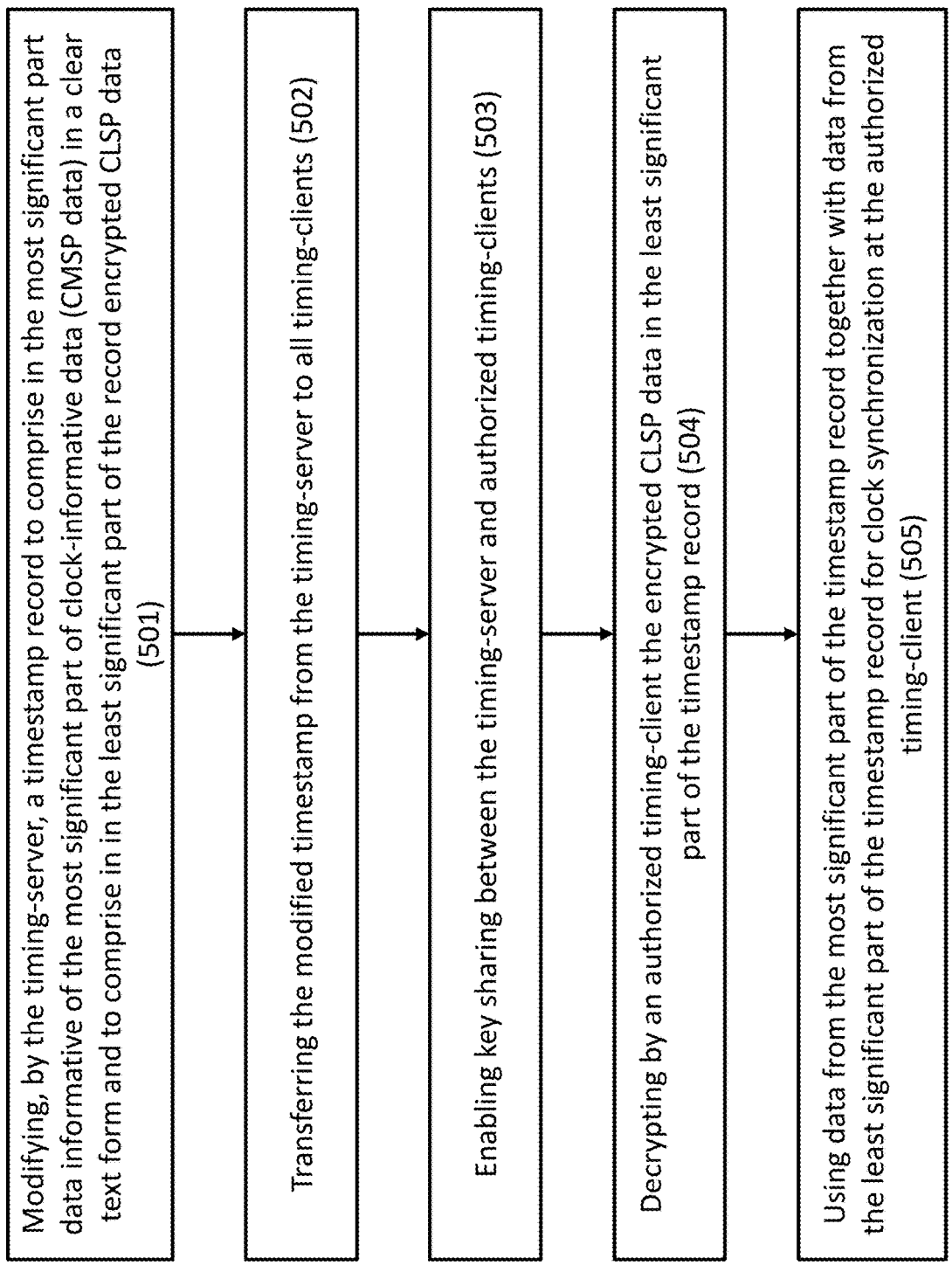
FIGS. 5-6 illustrate generalized flow charts of non-limiting examples of embodiments of the presently disclosed subject matter.

Referring to FIG. 5, there is illustrated a non-limiting example of embodiments of the presently disclosed subject matter. In the illustrated example, the timing-server modifies (501) a timestamp record to comprise the most significant part (RMSP) with the most significant part of clock-informative data (CMSP) in a clear text form and the least significant part (RLSP) with the least significant part of clock-informative data (CLSP) in an encrypted form and transfers (502) the modified timestamp to all timing-clients. The authorized timing-clients are configured to share (503) encryption keys with the timing-server. By way of non-limiting example, the encryption keys can be pre-shared. Additionally or alternatively, the encryption keys can be automatically exchanged with the help of a key distribution protocol (e.g. Transport Layer Security Protocol (TLS) as specified by RFC8446, etc.). In a non-limiting example of TLS protocol, the timing-server can be configured as a TLS server and the authorized timing-client can be configured as a TLS client. Further, in order to enable TLS-based automatic key exchange, both timing-server and timing-client can be equipped with valid Public Key Certificate according to ITU-T X.509.

Optionally, authorized timing-clients can be preconfigured to decrypt all timestamps when received from the timing server. Otherwise, time-transfer messages can comprise a special indication of required decryption of the encrypted part of the timestamp (e.g. it can be one of the reserved flags in PTP common message header, value of proprietary Extension Field Type in NTP message, etc.), and the authorized timing-clients can be further configured to decrypt the timestamp responsive to the special indication.

The authorized timing-client uses the respectively shared keys to decrypt (504) the received encrypted data in the least significant part of the timestamp, and uses (505) the data of the most significant part together with data of the least significant part of the timestamp for clock synchronization.

Non-authorized timing-client is incapable to use encrypted data in the least significant part of the timestamp and, thus, synchronize the clock using the knowledge of, merely, data in the most significant part of the time stamp.

Figure 6:
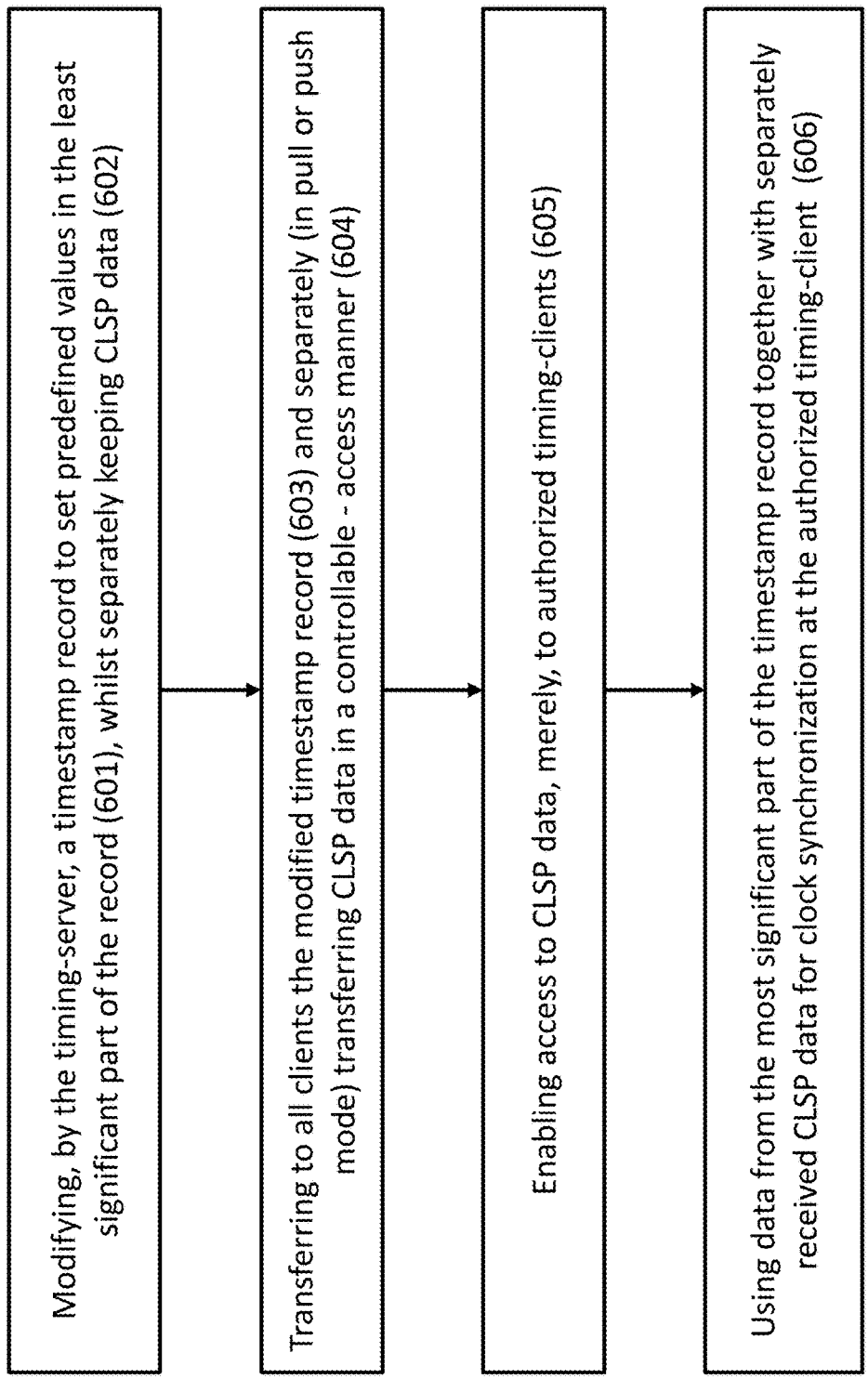

Referring to FIG. 6, there is illustrated another non-limiting example of embodiments of the presently disclosed subject matter.

The timing-server modifies (601) each timestamp record such that the least significant part of the record (RLSP) comprises predefined values (e.g. zeros), whilst the timing-server separately keeps (602) data informative of the values of bits in the least significant part of clock-informative data (CLSP). It is noted that, likewise, the values of bits in RLSP can be substituted by random or otherwise dynamically defined values.

Timing-server transfers (603) to all timing-clients the modified timestamp. Timing-server further separately transfers (604), in a controllable-access manner, data informative of CLSP. In certain embodiments, timing-server can transfer data informative of CLSP in correspondence with every SYNC/Follow Up message sent to the timing client during the collection period detailed with reference to FIG. 1b. Likewise, optionally, and depending on the configuration of the timing-client, data informative of CLSP can be further transferred in correspondence with DELAY RESPONSE messages.

The timing-server (and/or external system operating in conjunction with the timing-server) enables (605) access to data informative of CLSP, merely, to authorized timing-clients that synchronize their clocks using (606) data of the most significant part (CMSP) together with separately received data informative of the least significant part (CLSP) of respective clock-informative data.

By way of non-limiting example, CLSP can be sent as encrypted TLV attached to the protocol message. In such a case, enabling access to data informative of CLSP can be provided in a manner detailed with reference to FIG. 5. Messages carrying the modified timestamps can comprise a special indication informative of presence of the attached encrypted TLV, and the authorized timing-clients can be further configured to decrypt the attached CLSP accordingly.

By way of alternative example, the timing-server can transfer CLSP (in a clear text or in an encrypted manner) to the authorized timing-clients via an alternative (i.e. out of timing protocol) channel between the respective clock ports. Timing-server can obtain information on the authorized client in various ways. By way of non-limiting example, CLSP can be transferred in accordance with a preconfigured list available to the timing-server and comprising data indicative, for each authorized timing client, of clock ID of the client, IP address of the respective clock node and CLSP option. Optionally, instead of pre-configuring, an IP address can be derived from unicast message negotiation specified by the PTP protocol.

By way of another non-limiting example, the destination address and credential information required for CLSP transferring can be fully signaled by an authorized timing-client with the help of proprietary TLV in signaling messages used for unicast message negotiation. Timing server can further verify the received credentials (e.g. by facilitating Public Key Infrastructure (PKI) and SSL certificates).

Accordingly, the timing-server transfers CLSP to respective authorized clients as PTP management messages with proprietary TLV (type-length-value) structure informative of CLSP, or as proprietary PTP messages. The messages can be transferred in a push mode (e.g. once per n of sync messages) and/or in a pull mode responsive to a request received from an authorized timing-client. It is noted that as unicast messages are transferred merely to the authorized timing clients and comprise the same CLSP data, they can be transferred without encrypting the CLSP.

Time-transfer messages with the modified timestamps can comprise special indications of modification of the least significant part (e.g. this can be one of the reserved flags in PTP common message header, the value of proprietary Extension Field Type in NTP message, etc.).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of clock management in a packet data network (PDN) implementing a Time-transfer Protocol (TTP), the network comprising a plurality of timing-clients operatively connected to a timing-server, each timing-client maintaining a respective clock, the method comprising:
by the timing-server:
obtaining clock-informative data comprising the most significant part (CMSP data) and the least significant part (original CLSP data);
modifying the original CLSP data by encrypting thereof or by substituting with meaningless data, thereby giving rise to modified CLSP data;
recording the clock-informative data in a timestamp field of a TTP message, wherein a timestamp record in the timestamp field includes the CMSP data and the modified CLSP data;
transferring the TTP message comprising the timestamp field with the CMSP data and the modified CLSP data to all timing-clients among the plurality of timing-clients, while enabling transferring the original CLSP data in a controllable access manner;
enabling access to the original CLSP data merely to the authorized timing-clients among the plurality of timing-clients; and
enabling the authorized timing-clients to obtain the original CLSP data and synchronize their respective clocks using the obtained original CLSP data together with CMSP data, while enabling availability of the CMSP data for all timing-clients.

2. The method of claim 1 wherein the modified CLSP data are obtained by substituting the original CLSP data by meaningless data, the method further comprising encrypting the original CLSP data and transferring the encrypted original CLSP data as an encrypted TLV (type-length-value) data structure attached to the TTP message.

3. The method of claim 2, wherein the TTP message comprises a special indication of a presence of the attached encrypted TLV data structure, the TLV data structure to be decrypted with the help of keys shared between the timing-server and the authorized timing-clients.

4. The method of claim 1 wherein the modified CLSP data are obtained by substituting the original CLSP data by meaningless data, the method further comprising transferring the original CLSP data separately from the TTP message, wherein the original CLSP data are transferred only to the authorized timing-clients.

5. The method of claim 4, wherein the TTP message comprises a special indication of modification of the CLSP, thereby enabling the authorized timing-clients to obtain the corresponding separately transferred original CLSP data.

6. The method of claim 4, wherein the timing-server transfers the original CLSP data to authorized timing-clients in accordance with a preconfigured list available to the timing-server and comprising data indicative, for each authorized timing-client, of a unique clock identifier of the timing-client and IP address of a respective hosting network node.

7. The method of claim 4, wherein the timing-server transfers the original CLSP data to authorized clients in accordance with a preconfigured list available to the timing-server and comprising data indicative of a unique clock identifier of each authorized timing-client, wherein IP addresses of respective hosting network nodes are derived from unicast message negotiation specified by the TTP.

8. The method of claim 4, wherein the timing-server transfers the original CLSP data to respective authorized timing-clients as PTP signaling management messages with proprietary TLV carrying the original CLSP or as proprietary PTP messages.

9. A timing-server configured to operate in a packet data network (PDN) implementing a time-transfer protocol, the network comprising a plurality of timing-clients operatively connected to a timing-server, the timing-server comprising a processing and memory circuitry (PMC) operatively connected to a clock circuitry, wherein the PMC is configured to:
obtain clock-informative data comprising the most significant part (CMSP data) and the least significant part (original CLSP data);
modify the original CLSP data by encrypting thereof or by substituting with meaningless data, thereby giving rise to modified CLSP data;
recording the clock-informative data in a timestamp field of a time-transfer protocol's (TTP) message,
wherein a timestamp record in the timestamp field includes CMSP data and the modified CLSP data;
enable transferring the TTP message comprising the timestamp field with the CMSP data and the modified CLSP data to all timing-clients among the plurality of timing-clients, while enabling transferring the original CLSP data in a controllable access manner.

10. The timing-server of claim 9, wherein the modified CLSP data are obtained by substituting the original CLSP data by meaningless data and wherein the PMC is further configured to encrypt the original CLSP data and to enable transferring the encrypted original CLSP data as an encrypted TLV (type-length-value) data structure attached to the TTP message.

11. The timing-server of claim 10, wherein the TTP message comprises a special indication of a presence of the attached encrypted TLV data structure, the TLV data structure to be decrypted with the help of keys shared between the timing-server and authorized timing-clients.

12. The timing-server of claim 9, wherein the modified CLSP data are obtained by substituting the original CLSP data by meaningless data and wherein the PMC is further configured to enable transferring the original CLSP data separately from the TTP message, wherein the original CLSP data are transferred only to authorized timing-clients.

13. The timing-server of claim 12, wherein the TTP message comprises a special indication of modification of the CLSP, thereby enabling the authorized timing-clients to obtain the separately corresponding transferred original CLSP data.

14. The timing-server of claim 12, wherein the PMC is further configured to enable transferring the original CLSP data to authorized clients in accordance with a preconfigured list available to the timing-server and comprising data indicative, for each authorized timing-client, of a unique clock identifier of the timing-client and IP address of a respective hosting network node.

15. The timing-server of claim 12, wherein the PMC is further configured to enable transferring the original CLSP data to authorized clients in accordance with a preconfigured list available to the timing-server and comprising data indicative of a unique clock identifier of each authorized timing-client, wherein IP addresses of respective hosting network nodes are derived from unicast message negotiation specified by the time-transfer protocol.

16. The timing-server of claim 12, wherein the PMC is further configured to enable transferring the original CLSP data to respective authorized clients as PTP signaling management messages with proprietary TLV carrying CLSP or as proprietary PTP messages.

17. A non-transitory computer readable medium usable by a timing-server configured to operate in a packet data network (PDN) implementing a time-transfer protocol, the network comprising a plurality of timing-clients operatively connected to a timing-server, the computer readable medium comprising instructions that, when executed by a processor, cause the processor to perform operations comprising:

obtaining clock-informative data comprising the most significant part (CMSP data) and the least significant part (original CLSP data);

modifying the original CLSP data by encrypting thereof or by substituting with meaningless data, thereby giving rise to modified CLSP data;

recording the clock-informative data in a timestamp field of a time-transfer protocol's (TTP) message, wherein the timestamp record includes the CMSP data and the modified CLSP data;

enabling transferring the TTP message comprising the timestamp field with the CMSP data and the modified CLSP data to all timing-clients among the plurality of timing-clients; and enabling access to the original CLSP data merely to the authorized timing-clients among the plurality of timing clients.

\* \* \* \* \*